June 6, 1944.                G. J. KOEHLER                2,350,905
FLUID VALVE
Filed Dec. 11, 1941
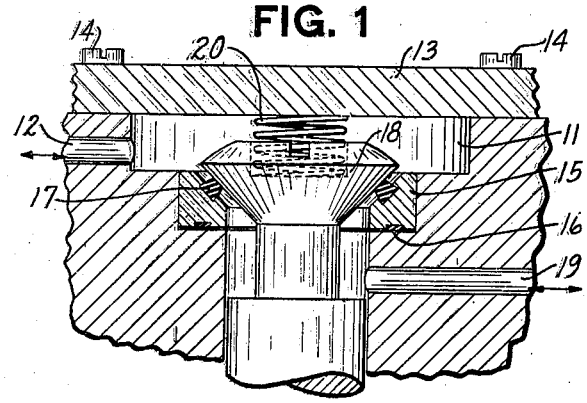
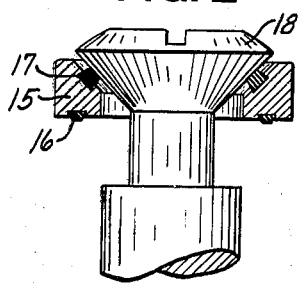
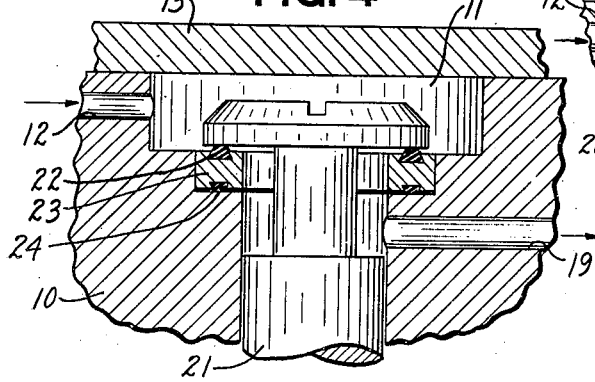
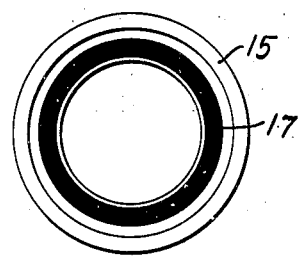
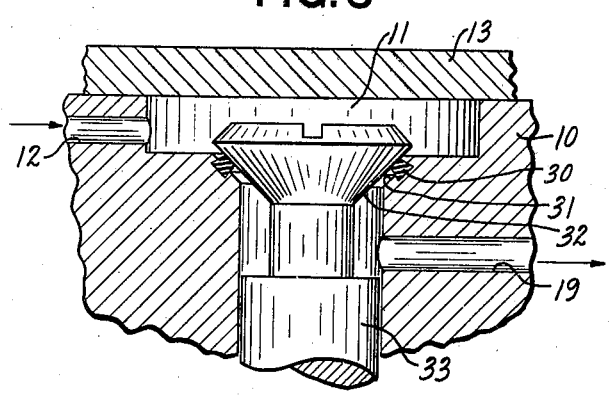
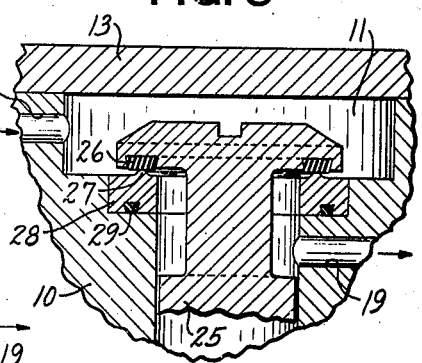
INVENTOR
GUSTAVE J. KOEHLER
HIS ATTORNEY Patented June 6, 1944

2,350,905

UNITED STATES PATENT OFFICE 2,350,905

FLUID VALVE

Gustave J. Koehler, Dayton, Ohio

Application December 11, 1941, Serial No. 422,560

2 Claims. (Cl. 251—167)

This invention relates to improvements in valves and is particularly directed to a novel valve seat construction for use in valves for controlling the flow of gases and highly volatile liquids.

One object of the present invention is the provision of a novel and efficient valve for controlling the flow of gases and liquids.

Another object is to provide a novel type of valve structure comprising a ring which is insertable into the valve body, and having grooves therein containing plastic material to seal the ring against leakage where it is inserted into the valve body and to form a yieldable leak-proof seat for the valve member or plug.

Still another object is to supply a novel type of fluid valve in which plastic material is molded in a groove in the valve body to form a yieldable leak-proof seat for the valve member or plug.

A further object is to provide an improved fluid valve comprising a ring which is insertable into the valve body and which is sealed against leakage therefrom by a plastic material molded in a groove therein, said ring engageable by plastic material molded in a groove in the valve plug to form a yieldable valve seat.

With these and incidental objects in view, the invention includes certain novel features of construction and combinations of parts, the essential elements of which are set forth in appended claims and a preferred form or embodiment of which is hereinafter described with reference to the drawing which accompanies and forms a part of this specification.

In the drawing:

Fig. 1 is a fragmentary sectional view, with parts in elevation, showing a preferred form of valve for controlling the flow of liquids.

Fig. 2 is a fragmentary detail view, partially sectioned, of the insertable valve seat ring and the plug of the valve shown in Fig. 1.

Fig. 3 is a plan view of the insertable valve seat ring of the valve shown in Fig. 1.

Fig. 4 is a sectional view, with parts in elevation, of a modified form of valve in which the insertable valve seat ring and the valve plug are of different design from that of the valve shown in Fig. 1.

Fig. 5 is a cross-sectional view of another type of valve, similar to the valve shown in Fig. 4, in which the plastic material for sealing the seat of said valve is molded in a groove in the valve plug.

Fig. 6 is a cross-sectional view, with parts in elevation, of another type of fluid valve, in which the plastic ring for forming the seat of the valve is molded in an annular groove in the face of an angular boring in the body of the valve.

Description

Figs. 1, 2, and 3 of the drawing illustrate one form of fluid valve embodying the features of the present invention.

The valve shown in Figs. 1, 2, and 3 comprises a body portion 10 made of any suitable material such as metal alloy and having a fluid chamber 11 formed therein by a boring, which chamber is connected by an inlet port 12 to a source of supply. A cover 13, secured to the body 10 by screws 14, covers the chamber 11 and gives access thereto for inspection or repair purposes.

The larger circumferential portion of a counter-boring in the chamber 11 has tightly pressed therein a valve seat ring 15 having in the bottom face thereof an annular groove of dove-tailed cross-section, in which is molded a plastic sealing agent 16, such as synthetic rubber, said sealing agent being forced into contact with the bottom surface of the counter-boring to effectively seal the valve ring 15 against leakage.

An internal cone-shaped surface in the ring 15 has therein an annular groove of dove-tailed cross-section, into which is molded plastic material 17, similar to the material 16, said material 17 forming a yieldable valve seat engageable by a conical surface on the head of a valve plug member 18, the stem of which member extends through the smaller circumferential portion of the counter-boring in the body 10, which is in central alinement with the counter-boring for the ring 15 and the chamber 11. The boring for the stem of the valve plug 18 is connected by an outlet port 19 to a source of demand, and an undercut portion of the stem of said valve plug 18, opposite the outlet port 19, permits unobstructed flow of the fluid from the source of supply to the source of demand, when said valve plug 18 is raised off of the seat 17. A compressible spring, 20, the lower end of which freely engages a boring in the top of the valve plug 18 and the upper end of which contacts the lower surface of the cover plate 13, is provided for yieldingly retaining the valve plug 18 in contact with the valve seat 17.

The valve shown in Figs. 1, 2, and 3 has been described herein as a downflow valve. However, said valve may easily be changed to an upflow or check valve by simply reversing the flow of fluid therethrough, in which case the outlet 19 will become the inlet and the inlet 12 will become the outlet. When the valve is used as a check valve, the spring 20 may be omitted, if desired.

When the valve shown in Figs. 1, 2, and 3 is used as a downflow valve, any suitable automatic or manual means may be used to raise the valve plug 18 off the seat 17 to permit the flow of fluid through said valve.

The synthetic rubber sealing rings 16 and 17 (Figs. 1, 2, and 3) have been found particularly satisfactory in overcoming leakage in valves used for controlling the flow of gases and highly volatile liquids, such as gasoline, and valves constructed along these lines have been found exceedingly efficient when used as "dilution valves" for controlling the flow of gasoline to the crank cases of aircraft engines to dilute the crank case oil to facilitate the starting of said aircraft engines in cold weather.

Obviously, a valve used for controlling the dilution of the motor oil of aircraft engines must be leak-proof and reliable in every respect in order to prevent excessive dilution of said motor oil and the attendant dangers connected therewith, and a valve of the type shown in Figs. 1, 2, and 3 and described above has proven satisfactory in every respect for such use.

The grooves containing the molded plastic rings 16 and 17 (Figs. 1, 2, and 3) are preferably dove-tailed in shape, as stated above and as here shown, to assist in retaining said plastic rings in place therein.

Another desirable feature of the invention is the insertable and removable seat ring 15, which may easily be removed from the valve body 10 and replaced by a new ring having new plastic rings 16 and 17 therein. This is particularly important in case the valve, for any reason, develops a leak, which, for example, may be caused by foreign matter becoming imbedded in the plastic seat 17.

Fig. 4 is a modification of the structure of the valve shown in Figs. 1, 2, and 3. In this case, a male valve member or plug 21, instead of having a conical seat-engaging surface, has a flat surface on the lower portion of the head thereof, which engages a plastic ring 22 molded in an annular groove in the top surface of a valve seat ring 23 pressed into a counter-boring in the chamber 11. The seat ring 23 also has a plastic ring 24 molded in an annular groove in the bottom surface thereof, which plastic ring engages the bottom of the counter-boring, in exactly the same manner as explained in connection with Fig. 1, to seal said valve seat ring 23 against leakage.

Fig. 5 illustrates a variation of the valve shown in Fig. 4, and in this case a valve plug 25 has in the bottom face of the head thereof an annular groove of dove-tailed cross-section, into which is molded a plastic sealing agent 26, which cooperates with a rounded annular ridge 27 on the top face of a valve seat ring 28 pressed into a counter-boring in the bottom of the chamber 11. A plastic ring 29, molded in an annular groove in the bottom face of the valve ring 28, is forced into engagement with the bottom surface of the counter-boring for said ring 28, to seal said ring against leakage.

The valves shown in Figs. 4 and 5 are similar in construction to the valve shown in Fig. 1 in that they have insertable and removable seat rings. However, another form of valve construction is shown in Fig. 6, in which a plastic seat ring 30 is molded in an annular groove in the face of an annular boring 31 in the body portion 10 of the valve, said plastic ring 30 adapted to cooperate with a conical surface 32 on the head of a valve plug 33, to form an efficient seal between said valve plug and the chamber 11, to efficiently control the flow of fluids therethrough.

Summarizing briefly, the foregoing specification discloses a novel type of valve in which a yieldable plastic substance is used to form an effective seal between the valve plug and the valve seat, said plastic substance being composed of material which is proof against attack by the type of fluids which flow through the valve.

While the forms of mechanism herein shown and described are admirably adapted to fulfill the objects primarily stated, it is to be understood that it is not intended to confine the invention to the forms or embodiments herein disclosed, for it is susceptible of embodiment in various other forms all coming within the scope of the claims which follow.

What is claimed is:

1. A small sensitive dilution valve for use in controlling the flow of a highly volatile fluid, comprising in combination a body portion having a bore and two counter-bores of different diameters, the counter-bore of larger diameter forming a fluid chamber having an inlet port communicating therewith, said bore having an outlet port communicating therewith; an insertable ring adapted to be pressed into the counter-bore of smaller diameter; an annular groove of dove-tailed cross section in the bottom surface of the insertable ring, said groove having molded therein a ring of plastic material, such as synthetic rubber, which extends slightly beyond the bottom surface of said insertable ring and is adapted to be pressed into yielding contact with the bottom surface of the counter-bore of smaller diameter, when the insertable ring is pressed therein, to form a leak-proof seal between the body portion and said insertable ring; an internal conical surface formed on the upper edge of the insertable ring; an annular groove of dove-tailed cross section in the internal conical surface, said groove having molded therein a ring of plastic material, such as synthetic rubber, which extends slightly above said internal conical surface to form a valve seat surface; a valve member having an inverted conical head, the outer surface of which is adapted to cooperate with the valve seat surface on the latter plastic ring, to form a sensitive leak-proof valve; and yieldable means to urge and maintain the valve member in engagement with the plastic seat ring.

2. In a small sensitive dilution valve for controlling the flow of highly volatile fluids, the combination of a metal body portion having a central bore and two counter-bores of different diameters, said bore and counter-bores being in axial alinement, the counter-bore of larger diameter forming a fluid chamber having an inlet port communicating therewith, said bore having an outlet port communicating therewith; a valve member having a head of inverted frusto-conical shape; a metal insertable ring, the outside surface of which is adapted to be a press fit in the counter-bore of smaller diameter; an annular groove of dove-tailed cross section in the bottom surface of the insertable ring, said groove having molded therein a ring of plastic material, such as synthetic rubber, which extends a slight distance beyond the bottom surface of the ring and is adapted to yieldingly contact the bottom surface of the counter-bore of smaller diameter, when the ring is properly pressed therein, to form a fluid seal between the body portion and said ring; an internal conical surface formed on the upper edge of the insertable ring, said surface arranged to coincide with the tapered surface of the inverted frusto-conical head of the valve member; an annular groove of dove-tailed cross section in the internal conical surface, said groove having molded therein a ring of plastic material, such as synthetic rubber, which extends slightly beyond the inverted conical surface of the insertable ring and cooperates with the frusto-conical head of the valve member to form a sensitive leak-proof valve seat; and yieldable means to normally maintain the valve member in resilient engagement with the plastic seat ring.

GUSTAVE J. KOEHLER.